(12) United States Patent
Usher et al.

(10) Patent No.: US 7,406,309 B2
(45) Date of Patent: *Jul. 29, 2008

(54) CELLULAR RADIO SYSTEM

(75) Inventors: Martin Philip Usher, Middlesex (GB); Andrew Robert Mead, Camberley (GB)

(73) Assignee: General Dynamics Advanced Information, Systems, Inc., Fairfax, VA (US)

( * ) Notice: Subject to any disclaimer, the term of this patent is extended or adjusted under 35 U.S.C. 154(b) by 335 days.

This patent is subject to a terminal disclaimer.

(21) Appl. No.: 09/833,593

(22) Filed: Apr. 13, 2001

(65) Prior Publication Data

US 2002/0019229 A1    Feb. 14, 2002

(30) Foreign Application Priority Data

Apr. 14, 2000    (EP)    .................................. 00303155
Apr. 14, 2000    (GB)    .................................. 0009392.2

(51) Int. Cl.
*H04M 3/42*    (2006.01)
(52) U.S. Cl. ...................... 455/417; 455/431; 455/12.1; 455/445; 455/433; 455/461; 379/88.25; 379/142.08; 379/215.01
(58) Field of Classification Search .............. 455/435.1, 455/422.1, 430–431, 433, 561, 414.1, 420, 455/426.1, 417, 445, 554.1, 555, 12.1, 461; 379/207.05, 207.06, 207.07, 207.08, 201.07, 379/211.01, 211.02, 88.25, 142.08, 215.01

See application file for complete search history.

(56) References Cited

U.S. PATENT DOCUMENTS

| 4,774,514 | A | 9/1988 | Hildebrandt et al. |
| 5,438,610 | A | 8/1995 | Bhagat et al. |
| 5,490,284 | A | 2/1996 | Itoh et al. |
| 5,519,761 | A | 5/1996 | Gilhousen |

(Continued)

FOREIGN PATENT DOCUMENTS

EP    0 494 525 A2 *    7/1992

(Continued)

OTHER PUBLICATIONS

Suzuki et al., "Call Routing and Data Model for Inter-Network Roaming in PCS", IEICE Trans. Commun., vol. E79 B. No. 9, Sep. 1996, pp. 1371-1379.

(Continued)

*Primary Examiner*—George Eng
*Assistant Examiner*—Brandon J Miller
(74) *Attorney, Agent, or Firm*—Steptoe & Johnson

(57) ABSTRACT

A method for forwarding incoming cellular communications to an aircraft is provided. A request is received to divert incoming calls for a cellular telephone number to a communication system on board an aircraft. The request includes at least a temporary identification code representing a cellular telephone aboard the aircraft. A diversion instruction is associated with the cellular telephone number. The diversion instruction represents an instruction to forward an incoming call for the cellular telephone number to the communications system aboard the aircraft. A state of a cellular telephone associated with the cellular telephone number is considered as busy, regardless of an actual state of the cellular telephone. An incoming telephone call to the cellular telephone number is forwarded, consistent with said considering and in accordance with the diversion instruction, to the communications system on board the aircraft.

24 Claims, 7 Drawing Sheets

U.S. PATENT DOCUMENTS

| | | | |
|---|---|---|---|
| 5,559,865 A * | 9/1996 | Gilhousen | 455/431 |
| 5,577,264 A | 11/1996 | Tuohino | |
| 5,842,132 A | 11/1998 | Fukutomi | |
| 5,887,258 A | 3/1999 | Lemozit et al. | |
| 5,950,129 A * | 9/1999 | Schmid | 455/431 |
| 5,963,877 A | 10/1999 | Kobayashi | |
| 6,002,929 A | 12/1999 | Bishop et al. | |
| 6,002,944 A | 12/1999 | Beyda | |
| 6,055,425 A | 4/2000 | Sinivaara | |
| 6,185,433 B1 * | 2/2001 | Lele et al. | 455/528 |
| 6,252,954 B1 * | 6/2001 | Malik | 379/221.09 |
| 6,269,243 B1 | 7/2001 | Corbefin et al. | |
| 6,321,084 B1 * | 11/2001 | Horrer | 455/431 |
| 6,324,398 B1 * | 11/2001 | Lanzerotti et al. | 455/431 |
| 6,324,405 B1 * | 11/2001 | Young et al. | 455/431 |
| 6,393,281 B1 * | 5/2002 | Capone et al. | 455/428 |
| 6,408,180 B1 | 6/2002 | McKenna et al. | |
| 6,463,278 B2 * | 10/2002 | Kraft et al. | 455/418 |
| 6,529,706 B1 | 3/2003 | Mitchell | |
| 6,603,967 B1 * | 8/2003 | Sinivaara | 455/431 |
| 6,611,682 B1 | 8/2003 | Projtz | |
| 7,123,905 B1 * | 10/2006 | Allaway et al. | 455/417 |
| 2001/0003706 A1 * | 6/2001 | Warburton et al. | 455/463 |
| 2001/0011016 A1 | 8/2001 | Chambers | |
| 2002/0107009 A1 * | 8/2002 | Kraft et al. | 455/417 |

FOREIGN PATENT DOCUMENTS

| | | |
|---|---|---|
| EP | 0 838 909 | 4/1998 |
| EP | 0 862 283 | 9/1998 |
| EP | 0 915 577 | 5/1999 |
| EP | 0 920 147 | 6/1999 |
| EP | 0 923 257 | 6/1999 |
| EP | 0 932 266 | 7/1999 |
| EP | 0 936 829 | 8/1999 |
| FR | 2773931 | 7/1999 |
| GB | 2169175 | 7/1986 |
| GB | 2282299 | 3/1995 |
| GB | 2310973 | 9/1997 |
| GB | 2320992 | 7/1998 |
| GB | 2 320 992 * | 8/1998 |
| GB | 2324395 | 10/1998 |
| WO | WO 94/28684 | 12/1994 |
| WO | WO 97/36442 | 10/1997 |
| WO | WO 97/37500 | 10/1997 |
| WO | WO 98/21838 | 5/1998 |
| WO | WO 98/26521 | 6/1998 |
| WO | WO 99/12227 | 3/1999 |
| WO | WO 99/62274 | 12/1999 |
| WO | WO 01/15337 | 3/2001 |

OTHER PUBLICATIONS

Uchiyama et al., "Network Functions and Signaling for Personal Roaming between Digital Cellular Standards", IEEE International Conference on Universal Personal Communications, New York, IEEE, vol. Conf. 4, Nov. 1995, pp. 447-451.

Nodera et al., "Interworking between GSM and PDC through IC Cards", Proceedings of the Conference on Communications (ICC), New York, IEEE, Jun. 1995, pp. 761-765.

GSM World Press Release, "GSM Association Agreement with SkyPhone to use *TAP* for Billing makes Calling from Aircraft Simple", http://www.gsm.org/news/press_releases_04.html, Aug. 1999.

Fernandez et al., "Le TFTS Alcatel 9810: un systemme europeen de communications air-sol", Commutation et Transmission, vol. 13, No. 4, Sotelec, Paris, France, 1991, pp. 5-16.

BTtoday Newsdesk website, "Lift off for BT in-flight GSM service", http://today.intra.bt.com/art6594.html, Jul. 2000.

Beresford, "Office in the sky is now ready for take off", BT today, Jan. 2000, p. 4.

International Search Report for PCT/IB01/00830.
International Search Report for PCT/GB00/03074.
International Search Report for PCT/GB00/03087.
International Search Report for PCT/IB01/00811.
International Search Report for PCT/GB00/03088.
International Search Report for PCT/IB01/00802.

* cited by examiner

CELLULAR RADIO SYSTEM

This invention relates to cellular radio systems, and in particular to a system for allowing the use of a mobile cellular telephone to be used on board a vehicle when it is out of range of the fixed base stations of a cellular telephone system. Such a situation is most likely to arise on board a ship or aircraft, but land-based vehicles may also pass through remote areas out of range of fixed base stations. The invention may also see use in providing temporary telecommunications coverage in areas where the fixed network, or the fixed part of the cellular network, has been damaged by natural disasters or other circumstances.

The system architecture of the GSM (Global System for Mobile radio) standard will first be discussed. However, other standards operate in a similar manner, and the use in this specification of GSM terminology should not be taken as limitative.

FIG. 2 illustrates in simplified form the system architecture of a "GSM"-standard cellular radio system 4, here acting as the fixed "host" network according to the invention, as will be described later. The terminology used in the GSM standard will be adopted in this description, but it should be understood that this is not to be taken as excluding the applicability of this invention from systems operating to other standards such as the proposed UMTS system. A cellular network 4 has a switching system (MSC) 41 to allow connection of one or more base transceiver sites (BTS) 43, through one or more base site control systems 42, to the PSTN 5 and thus to other telephones. Arrangements are made such that if the mobile telephone moves out of range of a base transceiver station, connection with the switching system can be maintained or resumed by a "handover" process, by which the mobile telephone establishes radio contact with another fixed radio transceiver. The "Base Site Controller" (BSC) (42) controls handover, frequency and timeslot allocation and other functions. A mobile telephone may establish radio contact with one of the base stations 43 in order to make and receive telephone calls. The network 4 also includes a "Visitor Location Register" 44, which maintains details of those cellular telephones currently co-operating with the network. Mobile telephones according to the "GSM" standard are capable of co-operating with different networks ("roaming" between networks). To allow this to take place, when a mobile telephone moves from one network to another, the network to which it has moved retrieves data from a "Home Location Register" 71 permanently associated with the mobile telephone. The network 7 in which the Home Location Register 71 associated with a given telephone is to be found is identifiable from the telephone's identity code. The Home Location Register 71 also records the identity of the network 4 with which the mobile handset is currently operating.

It is known to provide cellular radio coverage on board a vehicle such as a railway train, using a passive fibre optic network or similar, in which connections from several mobile telephones on board the vehicle are fed to a single repeater antenna on the vehicle which communicates with the nearest fixed base station to the vehicle. Handover from one fixed base station to another is handled for all mobile units together by a vehicle-borne repeater unit. This system reduces signalling overload when several mobile units on the vehicle enter a new cell at the same time. It also overcomes the potential difficulties of radio transmission to and from the interior of a metal vehicle. However, as the repeater itself co-operates with the fixed base transceivers of the cellular system, it cannot be used outside the range of such transceivers.

There are a number of further practical difficulties to be overcome in order to use a standard cellular telephone in an aircraft. Firstly, although reliable handover of a mobile unit can be achieved from moving vehicles travelling at speeds of up to 200 km/h, a typical passenger aircraft travels at speeds approaching 1000 km/h. Moreover, frequency re-use patterns, which allow several base stations to use the same radio frequencies without interference, are designed on the assumption that a mobile unit served by one base station is not able to exchange radio signals with other base stations using the same frequency. This assumption ceases to be valid if a mobile unit is several thousand meters above the ground, since it may be in line-of-sight of a large number of base stations simultaneously. On the other hand, many cellular base stations have antennas arranged for maximum gain in the horizontal plane, so an airborne cellular telephone may not be able to obtain a signal from any base station.

The use of portable radio telephones on board aircraft is currently discouraged, and in many cases forbidden, because of the perceived potential for interference with the aircraft's own electronic systems.

For truly global coverage, satellite telephones are available. However, these are expensive and much heavier than a cellular telephone, and also suffer from the screening effect of being inside a metal object. As with cellular telephones, their unrestricted use within an aircraft may be hazardous. A user without his own satellite telephone may use special facilities provided by the aircraft's operators, such as the service provided to several airlines by the applicant company under the Registered Trade Mark "Skyphone". This uses onboard terminals connected, through a satellite link between the aircraft and a satellite ground station, to the telephone network. Another system, TFTS (terrestrial flight telephony system, marketed as "Jetphone"), operates in a similar manner, but uses a direct link between the aircraft and the satellite ground station, without a satellite link. However payment for these services is generally at the point of use (or prepaid), and may be in a foreign currency. Calls made to the user's cellular telephone will not be successful unless the calls can be diverted to the telephone number of the onboard user terminal (which will generally not be known to the caller), and any special facilities offered by the user's cellular network will in general be unavailable. A user with his own cellular telephone account which, through "roaming" agreements between network operators, can be used in many different countries, would therefore prefer to continue to use his cellular telephone subscription when travelling within or between these countries on board an aircraft or other vehicle.

Proposals have been made, for example EP0915577 (Rohde & Schwartz) for a facility which would allow cellular telephones to make outgoing calls by way of an onboard telephone system. This allows the aircraft's onboard systems to impose power control on the mobile units and ensure that their radio transmissions are kept within safe limits. However, the cellular telephone is not directly connected to the cellular network, so conventional cellular radio location update processes cannot be used to inform the user's home network of its current location and allow incoming calls to be routed to the telephone.

According to a first aspect of the invention, there is provided apparatus for providing telephone connection between one or more cellular radio telephones and a fixed cellular radio switching system, comprising a moveable cellular system on board a vehicle, a fixed cellular radio switching system, and a tracking radio link providing radio connection between the moveable cellular switching system and the fixed cellular switching system, the moveable cellular system comprising a moveable telephone switching system connected to one or more base transceiver stations for providing radio connection with the cellular radio telephones, and having means for initiating a control call over the tracking radio link to the fixed cellular radio switching system in response to the detection of the presence of a cellular radio telephone in the area of coverage of the moveable cellular switching system, and the fixed cellular radio switching system having registration means responsive to such control calls to indicate to other switching systems that calls to a cellular radio telephone currently served by the moveable switching system should be initially directed to the fixed cellular radio switching system, the fixed cellular radio switching system also having call diversion means responsive to such control calls to allow incoming calls directed to the cellular radio telephone to be diverted to the moveable cellular switching system by way of the tracking radio link.

Effectively, the moveable switching system provides a cell, or small network of cells, which moves with the vehicle on which it is located, but whose operation appears to the user as an ordinary fixed base station of the fixed "host" cellular network to which the tracking network is connected. The fixed network also interfaces with the public switched telephone network (PSTN), and other networks to which it is connected, in a conventional manner. The host network co-operates with the moving cell through the tracking network, but no other cellular network needs modification. In particular, the user's home network requires no special features, so the facility can be used by any subscriber to a cellular telephone having a "roaming" agreement with the host network.

A second aspect of the invention, forming the fixed (ground-based) part of the system, comprises a cellular radio system having a fixed switching system for providing telephone connections for one or more cellular radio telephones, and a tracking radio link for connecting a moveable cellular switching system to the fixed cellular radio switching system, comprising registration means for responding to a control call made by a cellular radio telephone over the tracking radio link to the fixed cellular radio switching system to indicate to other switching systems that calls to a cellular radio telephone currently in the area of coverage of the moveable switching system should be initially directed to the fixed cellular radio switching system, and diversion means to cause such incoming calls to be diverted to the moveable cellular switching system by way of the tracking radio link.

A third aspect of the invention, forming the moveable (on board) part of the system, provides apparatus for providing telephone connection between one or more cellular radio telephones and a fixed cellular radio switching system, the apparatus comprising a moveable cellular radio switching system for providing a radio connection with the cellular radio telephones, and a tracking radio link for providing radio connection between the moveable cellular system and a fixed cellular radio switching system, wherein the moveable cellular switching system has means for initiating a call over the tracking radio link to the fixed cellular radio switching system in response to the detection of the presence of a cellular radio telephone in the area of coverage of the moveable cellular switching system, means for transmitting data relating to the cellular radio telephone to the fixed cellular radio switching system, and means to receive calls directed to the cellular radio telephone by way of the tracking radio link and route them to the moveable cellular switching system.

According to a fourth aspect, there is provided a method for providing network location functions in a fixed cellular radio switching system for one or more cellular radio telephones when said telephones are in communication with a moveable cellular radio switching system connected to the fixed cellular switching system by a tracking radio link, wherein the moveable cellular radio switching system initiates a call over the tracking radio link to the fixed cellular radio switching system in response to the detection of the presence of a cellular radio telephone in the area of coverage of the moveable switching system, and the moveable switching system and the fixed cellular radio switching system co-operate to cause calls directed to the cellular radio telephone to be transmitted to the moveable cellular switching system by way of the tracking radio link.

The invention further provides a method for routing calls made to a cellular radio telephone currently connected to a moveable cellular radio switching system wherein a fixed cellular radio switching system indicates that the cellular radio telephone is currently connected thereto such that calls are initially directed to the fixed cellular switching system, and wherein such calls, when received by the fixed cellular radio system, are diverted by the fixed cellular radio system to a node in a tracking radio system, the node in the tracking radio system being associated with the moveable cellular radio telephone switching system, the node then routing the call to the cellular radio telephone by means of the moveable cellular radio switching system.

The node typically has an address similar to those provided for at-seat telephone handsets on aircraft, but not assigned to such a handset. Instead, it is assignable to an individual cellular handset identity when such a handset registers its presence with the moveable cellular switching system.

Preferably the movable system has means for generating an association between an identity code of a destination node of the tracking radio link and an identity code of a cellular radio telephone, and means for storing the said associated identities in stores associated with the fixed and moveable cellular switching systems, thereby allowing both cellular radio switching systems to translate between the cellular radio identity and the node identity.

Preferably the apparatus is arranged such that calls directed to a cellular telephone currently associated with the moveable switching cellular system are diverted to a node of the tracking radio system having the identity associated with the cellular network identity, the node having means for connecting the call to the moveable cellular switching system and the moveable switching system having means for retrieving the cellular network identity associated with the node and routing the call to the cellular telephone having that identity.

Preferably calls directed to a cellular telephone currently associated with the moveable switching cellular system are diverted to a node of the tracking system having an identity associated with the cellular network identity, the node connects the call to the moveable cellular switching system and the moveable switching system retrieves the cellular network identity associated with the node and routes the call to the cellular telephone having that identity.

Preferably the tracking radio link is a satellite link, that is a radio connection between the moving vehicle and a fixed satellite ground station, which connection is routed by way of a relay station in orbit around the earth. The "footprint" of an individual geostationary satellite such as those in the "Inmarsat" system is very large, so an aircraft or ship would be able to remain in contact with the same satellite ground station through one satellite for the entire duration of a typical flight or voyage. Their "footprints" overlap to a sufficient extent that, should a transfer from one satellite to another nevertheless become necessary, it can be arranged to take place when the system is already shut down. Such shut downs may be required from time to time, for example at safety-critical parts of a flight or when interference from external base stations is likely, or may be arranged for a time such as early in the morning when few people would want to use the service and it may in any case be desirable to discourage the use of telephones to avoid disturbance to other passengers.

However, if continuous coverage is required, means may be provided for maintaining a call in progress when such a change is made.

In the described embodiment, which follows the system architecture of the "GSM" standard, an onboard MSC is provided, connected through the tracking system to a ground-based fixed MSC. This arrangement allows integration with other onboard communications systems such as an on-board private exchange. Among other advantages, this arrangement allows emergency calls to be intercepted and handled on board, whereas if all the switching were land-based, emergency calls from mobile units on board would have to be barred, to prevent them being routed to the emergency services local to the fixed MSC, which may be many thousands of kilometers from the moveable MSC.

If the aircraft or other vehicle comes within range of the radio base stations of a conventional cellular radio network there is a risk of interference between the onboard radio base station and those on the ground. Moreover, the onboard base station's power levels can be arranged to be kept within strict limits, and to impose power level controls on the mobile units. However, ground-based base stations do not have these constraints, which could result in the mobile units operating at inappropriate power levels. This is most likely to occur when the aircraft is near the ground. Moreover, the aircraft's operators would not normally have a licence to operate a cellular radio system within the territory being visited, in competition with the resident network. It is therefore desirable that the onboard system be disconnected in such circumstances, either manually, or when such interference is detected, or in response to some other function such as deployment of the aircraft undercarriage or in response to the "weight on wheels" detector which indicates to the aircrew that the aircraft is not airborne. Disconnection may be achieved by closing down the satellite link, or by disabling part of the onboard system.

The act of disconnection may be used to modify the diversion instructions in the "host" network, to prevent unnecessary signalling over the satellite link.

Once the users have left the aircraft, they would again be able to use their telephones, by "roaming" to the resident network.

An embodiment of the invention will now be described, by way of example, with reference to FIGS. 1 to 6 of the drawings. This embodiment is based on the system architecture of the GSM (Global System for Mobile radio) standard, and is illustrated for use on board an aircraft. Modifications suitable for use on other vehicles will be apparent to the person skilled in the art.

FIG. 1 shows the moveable vehicle-borne parts and FIG. 2 the fixed, ground based, parts.

Figure 5:
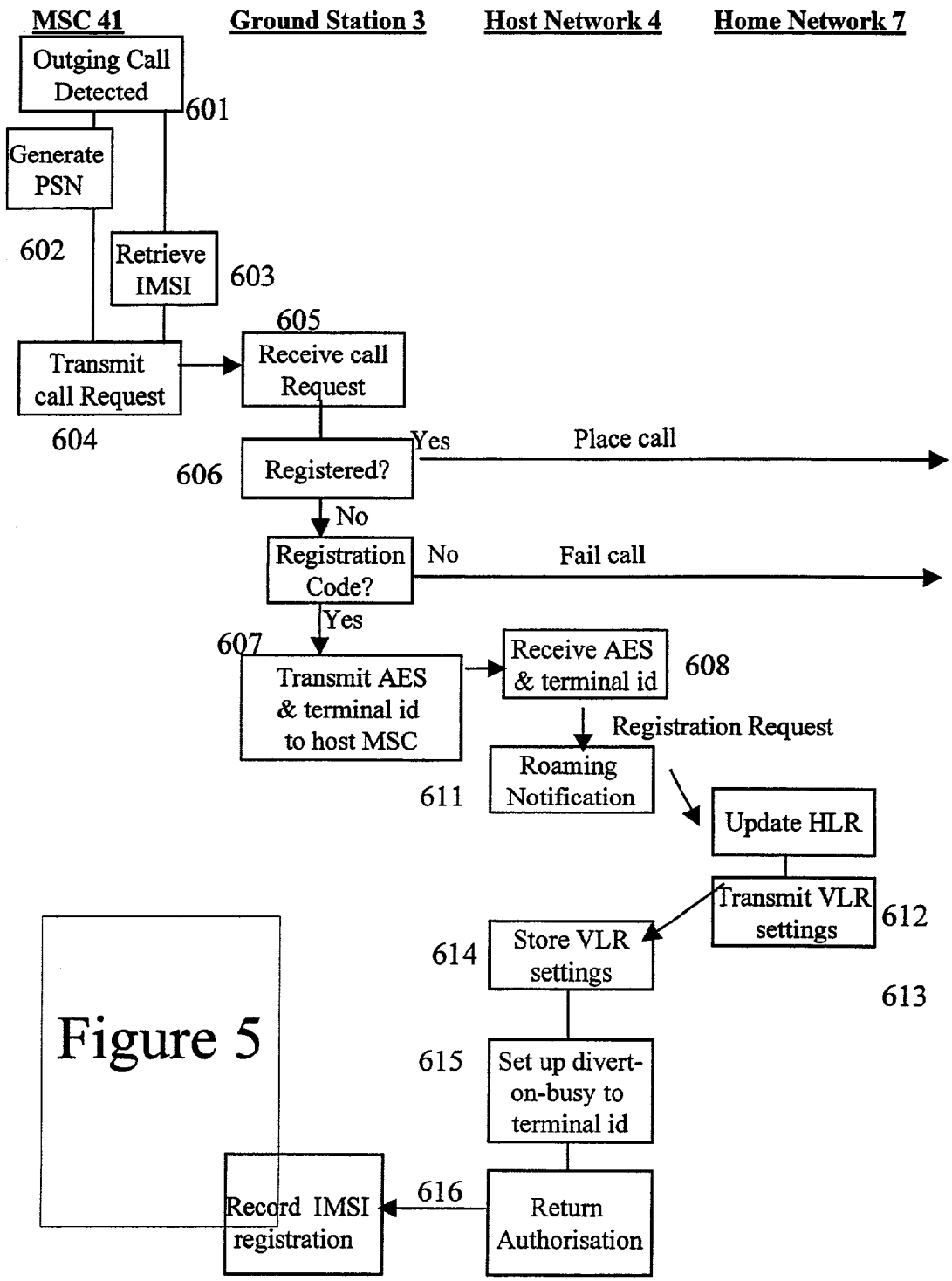
Figure 6:
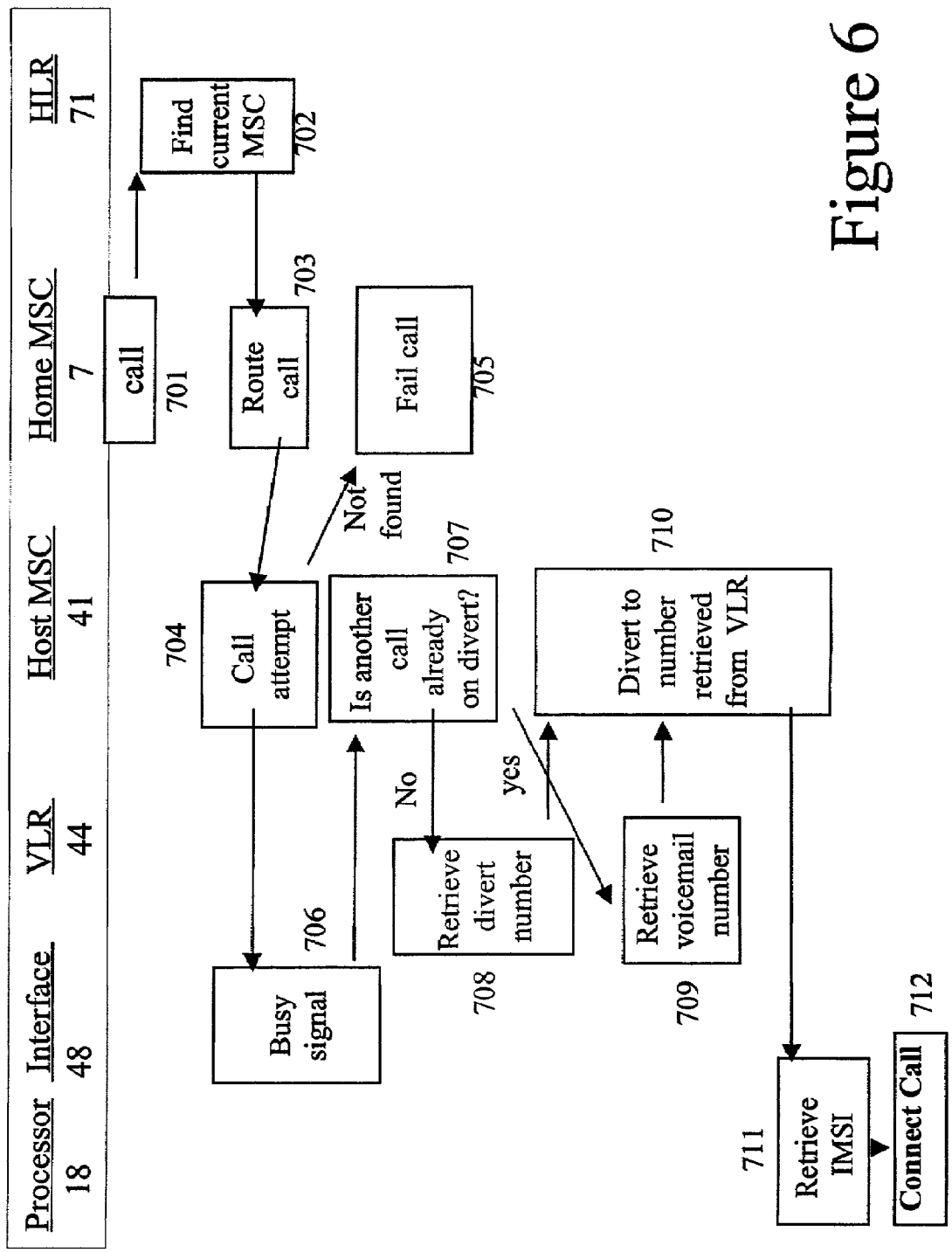
Figure 7:
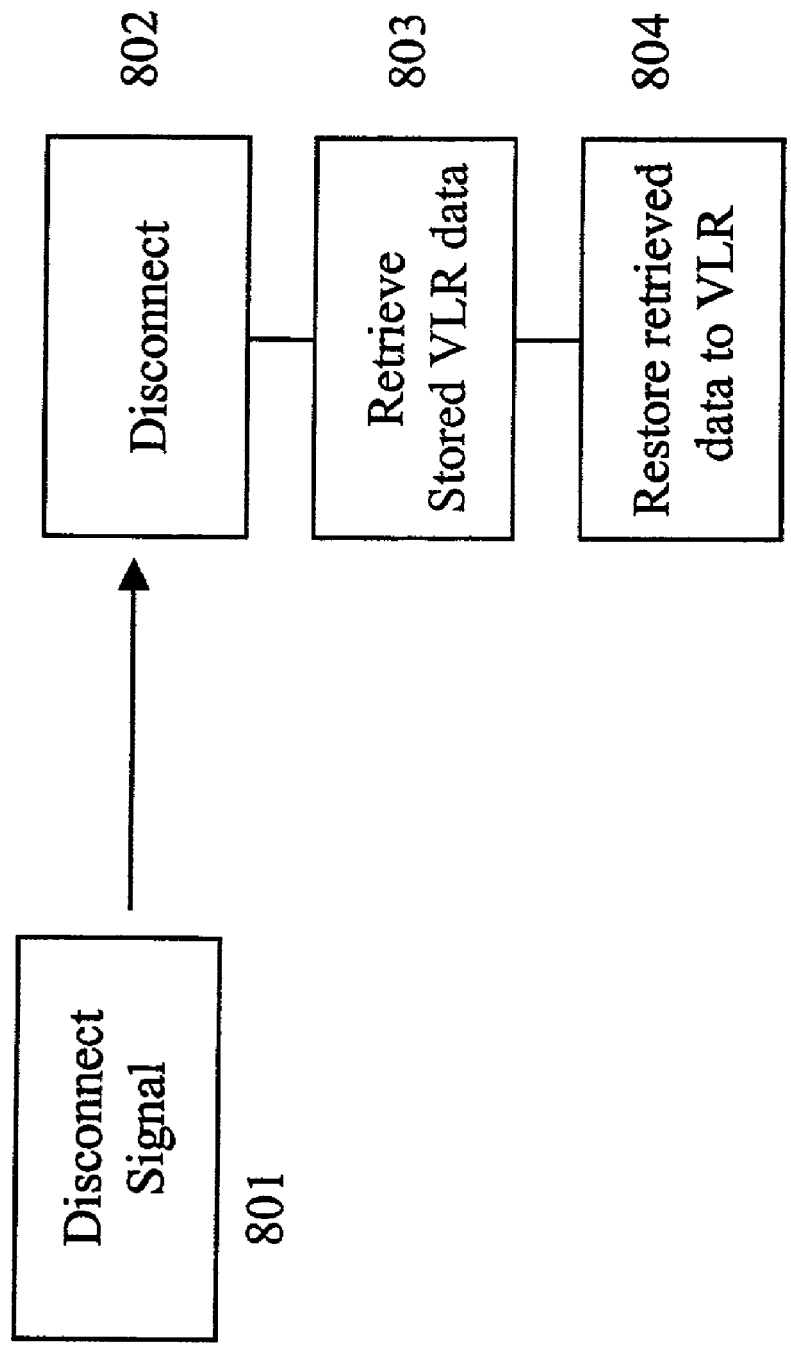

FIG. 5 is a flow chart showing the process by which a diversion is set up in the host system to a termination node associated with the moveable cellular switch FIG. 6 is a flow chart showing the process by which a call arriving at the fixed host cellular system is connected to a telephone currently co-operating with the moveable switch FIG. 7 is a flow chart showing the process by which the fixed host network restores the original settings for a telephone when it disconnects from the moveable cellular switch.

The system can be categorised into two main components: namely the onboard part 1 (FIG. 1) and the fixed part 2 (FIG. 2), comprising the satellite ground station 3 of the tracking radio system and the "host" cellular network 4, communicating with each other through a satellite connection 6. The onboard part (FIG. 1) comprises a moveable cellular system 11,12,14,16 and the moveable part 13 of the tracking radio system. The fixed part 2 (FIG. 2) is itself in two parts, namely a satellite ground station 3 and the fixed "host" cellular network 4, which is a public land mobile network (PLMN) 4, in turn interconnected with other PLMNs 7 and conventional wired networks (PSTN) 5 to allow calls to be made between users of different networks.

Figure 1:
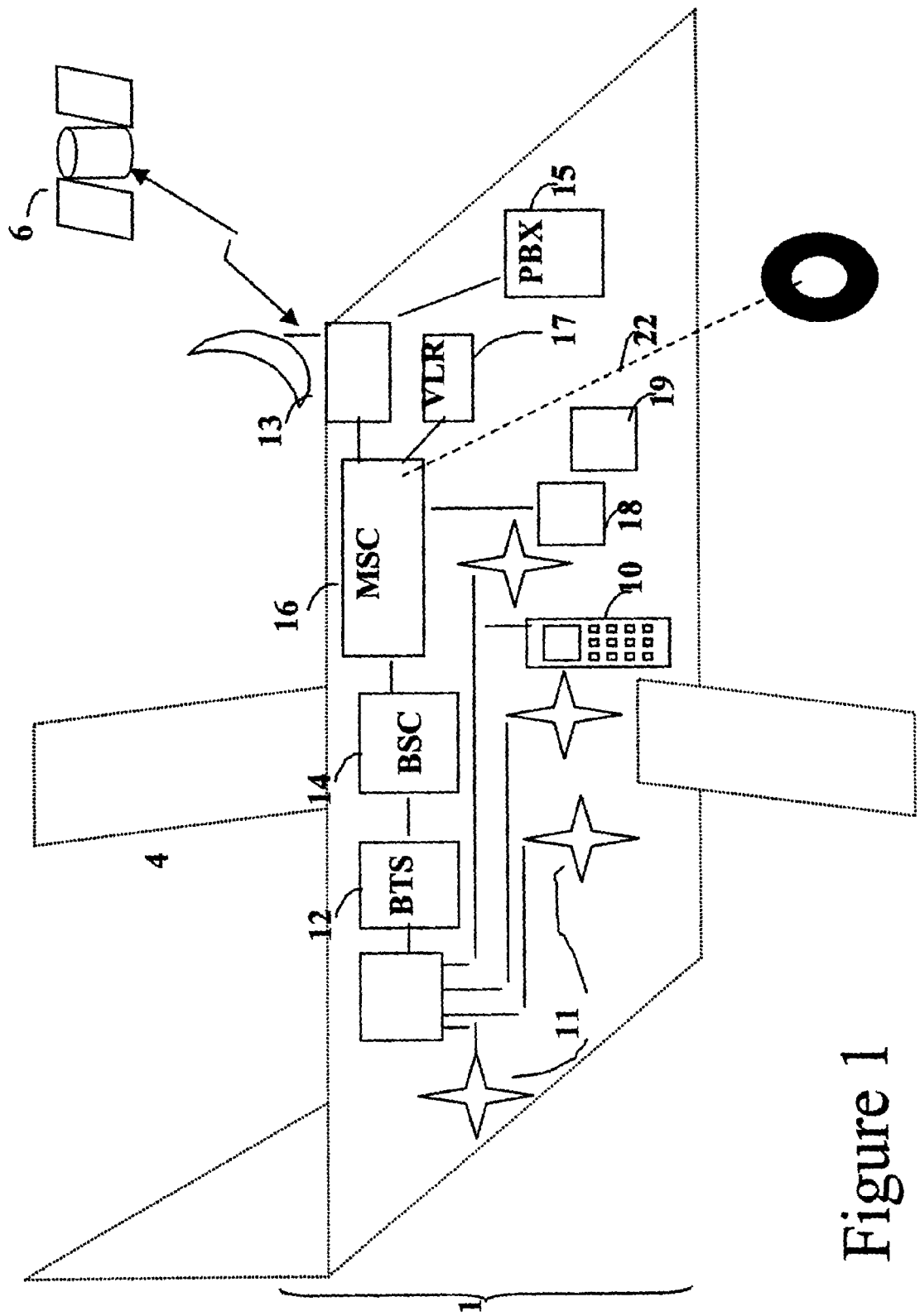
FIGS. 1 and 2 show the general arrangement of the various components which co-operate in this embodiment of the invention.
Figure 2:
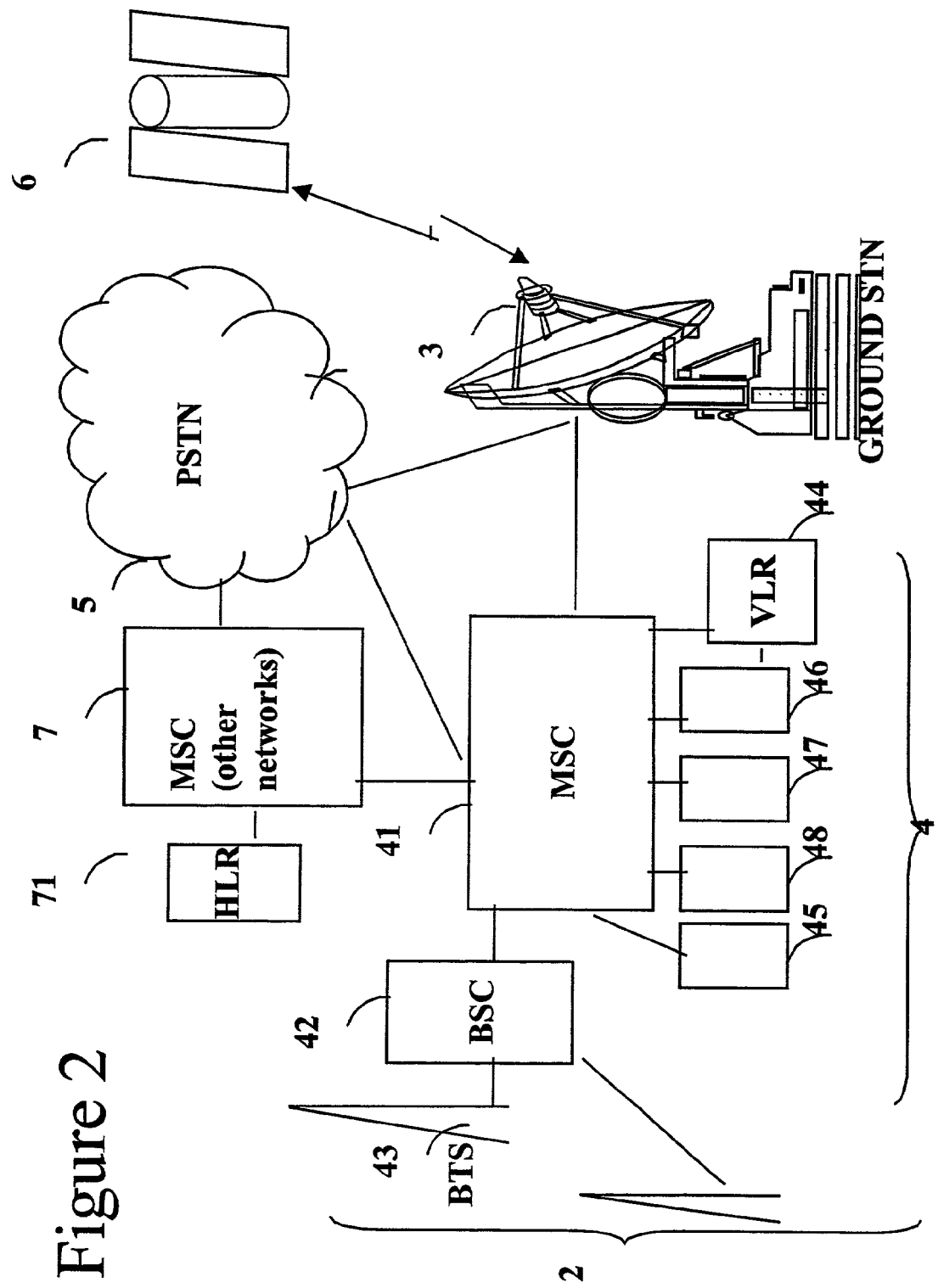

As shown in FIG. 1, the system provides a cellular radio subscriber with the ability to use his own handset 10 aboard an aircraft, located anywhere within an agreed satellite coverage area. The coverage on board the aircraft can be provided by any suitable means, using known radio repeater distribution systems 11 to provide radio coverage wherever required.

The distribution system 11 is fed by a base transceiver site 12, served by a base site controller 14 and a mobile switching centre 16, which has its own visitor location register 17, for onward transmission to the satellite ground station 3 via a satellite tracking system 13. The satellite tracking system may be a conventional satellite telephone system as commonly used for ship-to-shore communications, and for the airborne systems previously referred to, providing a satellite link 6 from the aircraft or ship's satellite tracking system 13 to the satellite ground station 3. The satellite ground station 3 is in turn connected to the mobile switching centre (MSC) 41 of a conventional cellular telephone system, referred to hereinafter as the "host" system 4 and shown in FIG. 2.

The satellite link 3-6-13 is therefore between an MSC 41 (the "host" MSC) of the land-fixed "host" network 4 and the onboard MSC 16. The user record in the HLR 71 identifies the mobile unit 10 as currently served by the land-based network 4, and routes the call to the host MSC 41, which will in turn recognise from its entry in the land based VLR 44 that this mobile unit is currently being served by the onboard MSC 16. The way this is arranged will be described later.

This arrangement allows integration of the onboard MSC 16 with the onboard switching capability associated with the conventional satellite telephone system and the aircraft's internal communications system 15. In particular it provides a simple means of providing passengers and crew with a "Wireless PBX" facility, as users on board the aircraft can communicate with each other through the BSC 14 without using the satellite link 3-6-13. When a call is made by a cellular telephone 10, the onboard MSC 16 first consults its VLR 17 to establish whether the called party is currently served by the same MSC 16. If this is the case, it connects the call without the use of any inter-MSC links. Thus calls made between two users both on board the aircraft 1 may be made without the use of the satellite link 3-6-13. The satellite connection provides several voice channels and a signalling channel (supervisory control-management channel), and can be made by any connection of appropriate capacity.

The host network 4 may support one or more further base site controllers 42 controlling conventional base transceiver sites 43. The Mobile Switching Centre 41 also has an associated "Visitor Location Register" 44 which, in conventional manner, records details of the cellular telephones currently co-operating with the Mobile Switching Centre 41, so that details can be exchanged with the Home Location Register 71 of the user's home network for billing purposes, and to allow incoming calls to the handset 10 to be routed correctly. These details include the identity of the link 3, 42 to which the user is connected, allowing different call charges to be applied for use in different cells, and in particular for calls made through the onboard base transceiver site 12.

In the cellular mobile network 4, standard GSM functionality is used. Users aboard the aircraft will be able to use this service provided they are subscribers to the host network 4, or any other network 7 which has a "roaming" agreement with the host network 4, provided the subscriber has the roaming capability authorised by his service provider.

The principal components of the satellite ground station 3 relevant to this invention are an antenna 34 which communicates, by way of the satellite 6, with the onboard system 1, an Access Control and Signalling Equipment (ACSE) 30 which carries out call switching functions to allow calls made from the onboard system to be placed through the public switched telephone network (PSTN) 8 to other telephones, and a Card Management System 32 which, in a conventional system, identifies and authorises the use of terminals of the onboard satellite system. Associated with the card management system 32 there is an "aircraft location register" 31 which monitors the terminals currently served by each individual satellite, and modifies the functioning of the card management system when a terminal, for example on board an aircraft 1, moves from the coverage area of one satellite 6 (and its satellite ground station 3) to another.

Figure 4:
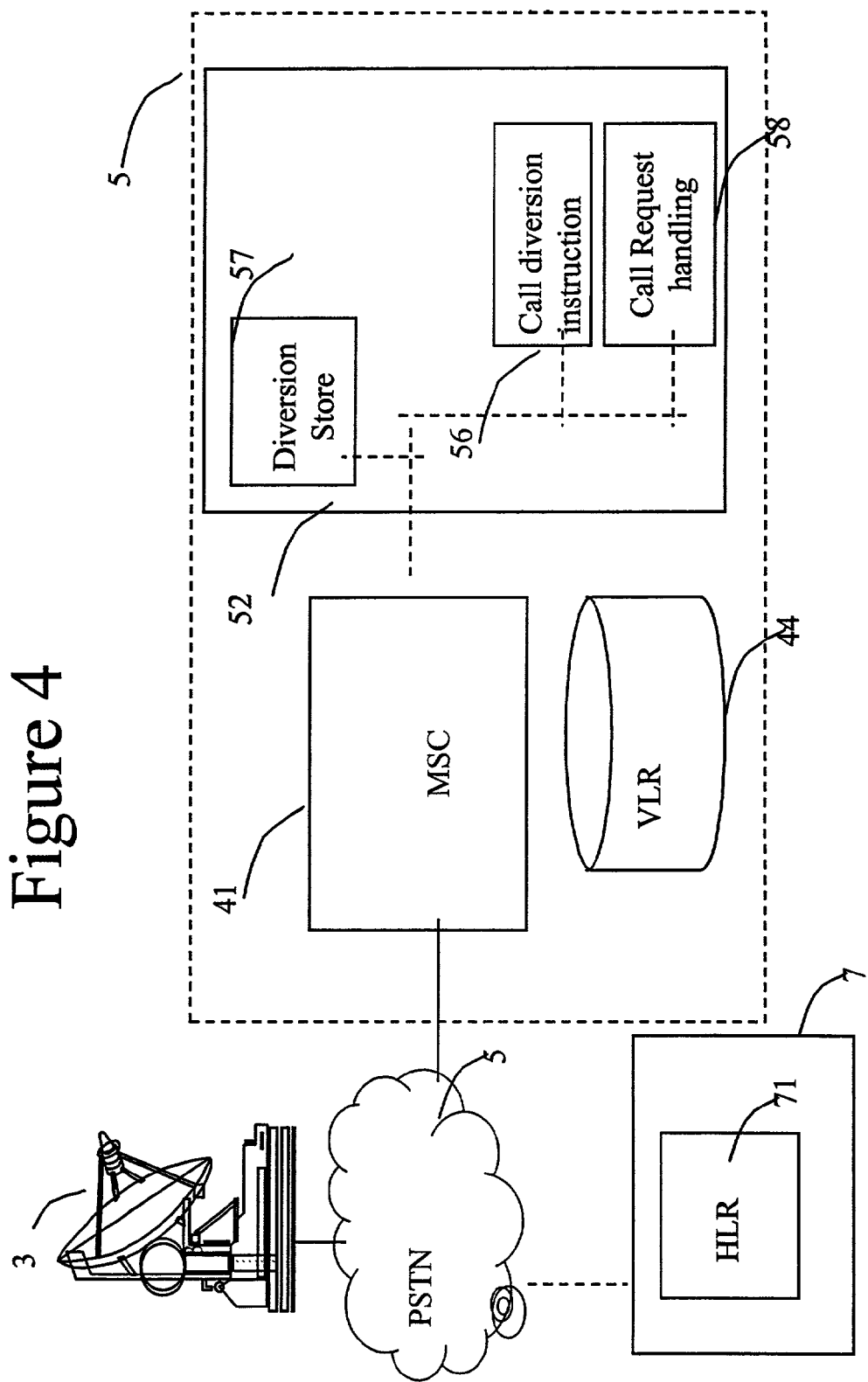
FIG. 4 is a schematic diagram of the switching system, interface unit, and associated parts of the fixed "host" cellular system.

The card management system 32 interacts with the "host" cellular telephone network 4, shown in more detail in FIG. 4. This network 4 is connected to the public switched telephone network (PSTN) 5 and to other cellular networks 7 through a mobile switching centre 41.

In this embodiment of the invention, the "host" network 4 operates like a conventional cellular network, but is provided with an interface unit 48 for interworking with the satellite ground station 3. This interface 48 allows the switching centre 41 to obtain user details (in particular the identity of a mobile handset) from the satellite system 3 to allow it to appear to the network 4, and thus to the HLR 71 in the user's home network, that the mobile handset is in radio communication with a base station under the control of the mobile switching centre 41 when in fact it is in communication with the onboard MSC 16. The mobile switching centre can then arrange for call forwarding instructions to be stored in the VLR 44, to cause incoming calls directed to that handset to be diverted, through the switching system 30 of the satellite network 3, to the onboard MSC 16.

Figure 3:
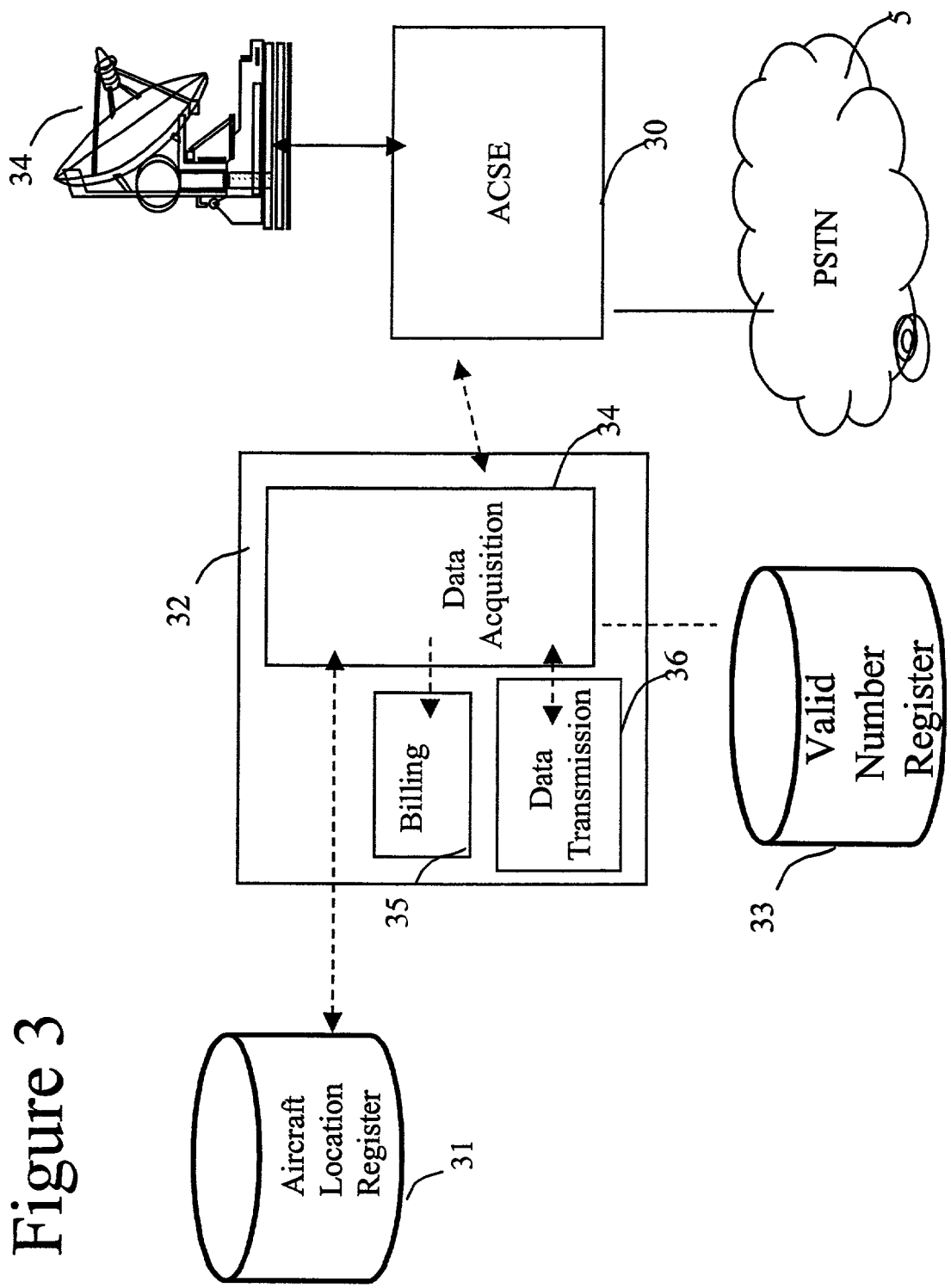
FIG. 3 is a schematic diagram showing the functional relationships between the components of the fixed part of the tracking radio system which co-operate in the invention.

FIG. 3 illustrates an embodiment of the satellite ground station of the invention, applied to a satellite telephone system such as that provided by the applicant company under the Registered Trade Mark "Skyphone".

The operation of the system will now be described with reference to FIG. 5. When a mobile unit 10 first makes contact with the onboard cellular system 1 it transmits its identity code (IMSI) to the onboard MSC 16 in the usual way. The onboard MSC 16 can obtain verification data from the user's HLR 71 (identified by the IMSI code) to verify the authenticity of the user, and permit outgoing calls. However, because the onboard MSC 16 is only contactable through the satellite system, incoming calls to the mobile unit 10 cannot be reliably routed to the onboard MSC 16 over a conventional link. In order to avoid a requirement for special facilities in each network 7 it is convenient to make the mobile unit 10 appear to be working to a conventional mobile switching centre 41.

When the onboard MSC 16 detects a call attempt or registration attempt from a mobile unit 10, (step 601) it collects from the mobile unit its identity code (IMSI) and passes it to a processor 18. If the processor 18 has not previously done so, it generates a temporary onboard identity for association with the mobile identity code (IMSI), and stores it in a memory 19 (step 602). For aircraft fitted with at-seat satellite telephone equipment, each handset has an identity code (generally related to the number of the passenger seat to which the handset is fitted) to allow outgoing calls to be billed to the correct user and to allow the system to be used to communicate between passengers. Spare numbers in this system (referred to herein as "pseudo seat numbers"—PSN) may be used as the temporary onboard identities allocated to mobile handsets working to the onboard MSC 16. If the mobile handset 10 has previously contacted the onboard MSC 16, and not subsequently de-registered, the processor 18 retrieves the PSN corresponding to the IMSI from the memory 19 (step 603).

In existing onboard systems a user cannot receive calls unless the caller knows the unique "AES" number of the satellite handset 20, which is made up of the seat code and an identity code of the aircraft (which together make up a unique "AES" code). It is unlikely, even for a normal satellite handset, that a caller would know the AES code, as the number depends on the identity of the aircraft, the seat, and the serving satellite or base station. (It should be noted that the passenger list of an aircraft is not normally released to the general public until the flight has ended, for security reasons). The present embodiment allows the host network to translate the called party's IMSI to an AES code, which includes a pseudo-seat number (PSN), which is allocated randomly from the numbers left spare after codes have been allocated for at-seat terminals. The translation takes place in the host network, without the need for the caller to know the AES code.

The temporary onboard identity code PSN associated with the called party's IMSI is returned to the onboard MSC 16 which sets up a call over the satellite system to the host MSC 41 of the host network 4 (step 604). The satellite system requires certain authentication data on call set up, namely the AES code and a subscriber identity code which normally identifies an individual subscriber to the satellite system or, if the user does not have an account with the satellite system, credit card details or other details to allow payment to be made. In the present case the onboard MSC 16 provides the cellular telephone's code (IMSI) as the subscriber identity code. For security reasons, this code may be encrypted. If an outgoing call attempt is being made, a call attempt is then made to the number dialled; otherwise a special code, referred to herein as the non-call code ("NCC") is used.

The satellite ground station 3 shown in FIG. 3 has a radio antenna system 34 for communicating with the onboard system 1, through a satellite link 6 or otherwise. Signals are handled by an Access Control Signalling Equipment (ACSE) 30 which carries out switching functions to route calls to or from the public switched telephone network (PSTN) 5. An aircraft location register 31 stores identification details for all aircraft 1 currently served by the satellite ground station 3. When an aircraft passes into the control of a different satellite ground station (or satellite in a satellite system) the aircraft location register in the second satellite ground station acquires the aircraft details.

A subscriber management system 32 in the satellite ground station comprises a data acquisition unit 34 which reads identification data transmitted from the aircraft (step 605) to identify the subscriber, confirm his account details and arrange billing for any calls made, through a billing system 35 which raises invoices, or interacts with the systems of a credit card operator, bank, or other telephone operator. In the present case the card management system recognises the IMSI transmitted as the subscriber identity. Provided the IMSI has previously been registered with the subscriber management system 32 (as will shortly be described: step 616) the call is authorised using the satellite system's authorisation checking and billing system as for any call from an onboard satellite terminal, and connected to the PSTN 5 (step 606), billing details being passed to the home network through the host MSC 41.

If the caller has not previously been registered, but a special non-call registration code is used, the ACSE 30 recognises it as being an authorised free call to the host MSC 41 and routes it accordingly (step 607). Calls using this code are permitted by the subscriber management system 32 even if the IMSI has not previously been registered with it.

The host network 4 will, in general, not be the same as the user's home network 7. In this network 4 an interface unit 48 provides certain additional functionality to co-operate with the satellite ground station 3.

When a call is received from the satellite ground station 3 using the non-call code (NCC) the host MSC 41 routes the call to the interface unit 48 (step 608). The interface unit 48 then retrieves the identity (IMSI) of the cellular telephone, and the AES identity of the onboard terminal 20 (step 608, FIG. 5). The IMSI (de-encrypted if necessary), is passed to a network registration unit 45 which exchanges signals with the host mobile switching centre 41 in the same way that a real cellular telephone would do if registering through one of its base stations 43. The mobile switching centre therefore informs the user's Home Location Register 71 that the mobile telephone is now registered with the network 4 (step 611). The Home Location Register 73 records that the mobile handset is now registered with host MSC 41 (step 612).

It should be noted that, although registered with the host MSC 41, the user's mobile handset is not operatively connected to the host MSC 41. The user, and the handset, may be on a suitably equipped vehicle anywhere in the world within the coverage area of the satellite network 6.

The user's details, including any diversion instructions, are next sent by the Home Location Register 71 to the network's VLR 44 (step 613). A store 47 records a copy of the details of these diversion instructions (step 614).

Conventionally, any incoming calls for a mobile user are sent in the first instance to the user's home network 7, and the HLR 71 provides information to identify the MSC where the mobile handset is expected to be found, which is the host MSC 41. Consequently, in the present arrangement, any incoming calls intended for the mobile user will now be directed to the network 4, as the mobile user is currently registered there.

The interface unit 48 passes the AES code to a call diversion instruction unit 46, which generates a "divert on busy" instruction to the VLR 44 (step 615). This is a standard divert arrangement, and operates such that should the mobile unit appear to be already engaged on a call when a new call attempt is made to it, the new call attempt is diverted to a specified directory number, in this case the AES code allocated to the mobile unit. This diversion instruction replaces any previous instruction held in the VLR 44.

Finally, the registration process is closed by returning an authorisation code from the host MSC 41 to the subscriber management system 32 (step 616) to allow the IMSI to be recognised as a valid user identification for subsequent outgoing calls.

Of course, although the mobile telephone 10 is recorded in the home location register 71 and in the host's visitor location register 44 as being connected to the host MSC 41, it is not really there and therefore the host MSC 41 is unable to connect incoming calls to the mobile telephone in the conventional way, or to identify the current true operating condition (switched off, busy, ready for calls, etc) of the mobile handset 10. Instead, the system responds to a call attempt as will now be described with reference to FIG. 6.

When a call attempt is made (step 701), the MSC in the home network 7 to which the call is initially routed obtains from the HLR 71 the current location of the mobile telephone (step 702), and on receiving the identity of the host MSC 41, directs the call there (step 703). The host MSC 41 in turn attempts to transmit the call attempt to the currently serving base station, which is in fact the interface unit 46 (step 704). If the disconnect procedure (to be described later with reference to FIG. 7) has been carried out, the call will fail (step 705) and a signal is transmitted back to the home MSC 71. Otherwise, the interface unit 46 automatically returns a "busy" signal to any such request (step 706). Note that the interface unit 46 has no information regarding the true operating state of the mobile unit 10. It is merely arranged to emulate the target mobile unit's response to a call attempt when the target mobile unit is in the "busy" condition.

The host MSC 41, on receiving the "busy" signal, checks whether any incoming call currently in progress to that mobile handset has already been diverted (step 707). (This is a standard procedure, done to ensure that call diversions are not attempted if they will not actually succeed). If there is no such diverted call in progress, the host MSC 41 retrieves the diversion information (the AES) from the VLR 44 (step 708) allowing it to route the call through the PSTN 8 and the satellite system 3 to the onboard system 1 (step 710).

The onboard system 13 routes incoming calls to a node of the onboard system according to the AES code. If the node is connected to a real at-seat terminal, the call is simply routed to that terminal. However, in this case, the code corresponds to a pseudo seat number, which the onboard satellite system switch 13 recognises as meaning that the call is to be routed to a node connected to the onboard MSC 16. The onboard MSC 16 uses the processor 18 to retrieve from the memory 19 the cellular identity (IMSI) corresponding to the PSN, (step 711) and then connects the call to the mobile handset 10 having that identity in the conventional manner (step 712). Thus the interaction between the onboard MSC 16 and the handset 10 is entirely conventional: ordinary handsets can be used and no initial authorisation is required other than the standard procedures used to ensure that international "roaming" is permitted.

If a second call attempt is made to a handset already in use, the host MSC 41 will identify that the divert instruction will not work as it is already handling a diverted call to that number (step 707). The normal default condition in such cases is to arrange for the second call to be diverted to the user's voicemail address (not shown) in his home network 7, (step 709, 710). The user is also sent a message to inform him of the new voicemail message. This message would normally be sent to the mobile unit, which appears to the host MSC 41 to be co-operating with the interface unit 48, so the host MSC 41 transmits the data message to the interface unit 48 (step 711). In order to inform the user of the new voice mail message, the interface unit 48 now regenerates the data message for forwarding to the onboard MSC 16 via the satellite system 3 (step 712) for alerting the user terminal 10 either during the call or after it ends.

As the onboard system 1 is itself mobile, being on board an aircraft, call routing to that termination may require revision from time to time. For example, the "Inmarsat" satellite system comprises five geostationary satellites, which each provide cover for part of the earth's surface. These areas of coverage overlap to a large extent, but nevertheless on a long flight the aircraft may pass out of the area covered by one satellite into that served by another. This causes a small but significant change in the network address AES of any terminal on board the aircraft. The aircraft location register 31 monitors the identity of all aircraft currently being handled by the satellite ground station 4. When an aircraft moves into range of a different satellite 6, the corresponding satellite ground station 3 instructs its subscriber management system 32 to send an instruction to the interface unit 46 in the host network. The interface unit 46 responds by transmitting a new call diversion instruction to the VLR 44, so that any further incoming call attempts are diverted to the new network address (AES) of the node corresponding to the terminal 10. Note that the diversion store 47 is not updated.

Note also that this does not affect calls already in progress. There is usually sufficient overlap in satellite coverage areas that handover from one satellite or base station to another can be arranged to take place when no call is in progress During the flight the user may decide that he no longer wishes to have his calls diverted to the terminal 10, and switches it off. The onboard MSC 16 will therefore fail to locate the mobile handset 10 at the next registration update. As previously discussed, it is also desirable to disable the onboard system 1 when the aircraft is on approach to landing, to avoid interference with aircraft systems at this critical point in the flight, and also to avoid interference with base stations on the ground. Disconnect codes may therefore be generated in the onboard MSC 16 for all the handsets 10, either by the cabin crew or automatically in response to a signal detected on the aircraft's databus 22 which is indicative of the imminent end of the journey, such as time remaining to destination (as determined by the aircraft's flight management system), low altitude, deployment of undercarriage, or weight on wheels.

On receiving a de-registration signal (steps 801,802 FIG. 7), the host network 2 retrieves the original divert information from the store 47 (step 803) and stores that in the VLR 44 (step 804), thereby restoring the user's own selected divert instructions automatically.

Once he has left the aircraft, the user may switch on his mobile telephone 10, which will register with the local network (e.g. network 7), informing the home location register 71 of the location update (note that in general the HLR 71 will not be in the same network as the local network 7). The HLR 71 retrieves the user's VLR settings from the previous host network 2. Because the original VLR data has been restored (step 804), the temporary divert data used whilst the user was connected to the onboard system is not fed back to the HLR. All data relating to the user can then be deleted from the VLR 44 in the "host" network 2.

In use, both parties to a call, and most of the cellular network, operate normally. The cellular telephone 10 co-operates with the base station 12 on the aircraft as it would with any other base station 43. The home location register 71 identifies the cellular telephone 10 as currently served by the host MSC 41, and routes incoming calls accordingly. This invention therefore allows connection to be made to conventional handsets 10 using standard cellular telephony equipment. The operation of the host MSC 41 and the onboard MSC 16 are both largely conventional except for the number translation functions carried out by the interface units 18, 48. Using roaming capabilities, just one host MSC 41 can provide connection to a large number of airborne MSCs 16, anywhere in the range of the satellite system 3, 6.

What is claimed is:

1. A method for forwarding incoming cellular communications to an aircraft, comprising:
   receiving a request to divert incoming calls for a cellular telephone number to a communication system on board an aircraft, the request including at least a temporary identification code representing a cellular telephone aboard the aircraft;
   associating a diversion instruction with the cellular telephone number, the diversion instruction representing an instruction to forward an incoming call for the cellular telephone number to the communications system aboard the aircraft; and
   considering a state of a cellular telephone associated with the cellular telephone number as busy, regardless of an actual state of the cellular telephone;
   wherein, an incoming telephone call to the cellular telephone number is forwarded, consistent with said considering and in accordance with the diversion instruction, to the communications system on board the aircraft.

2. The method of claim 1, wherein said associating a diversion instruction comprises giving priority to an address of the communications system on board the aircraft over any previous diversion instruction.

3. The method of claim 1, wherein the communication system on board the aircraft is a communication device in wireless communication with the cellular telephone aboard the aircraft.

4. The method of claim 1, wherein said associating a diversion instruction comprises modifying a preset diversion instruction associated with the cellular telephone to include the communication system on board the aircraft.

5. The method of claim 1, further comprising:
   receiving an incoming call for the cellular telephone number; and
   forwarding the incoming call to the communication system on board the aircraft.

6. The method of claim 1, the cellular telephone having at least one original diversion instruction prior to said associating a diversion instruction, the method further comprising:
   receiving an incoming call for the cellular telephone number;
   diverting, in response to an actual state of the cellular telephone being busy, the incoming call consistent with the at least one original diversion instruction.

7. A method for routing incoming cellular telephone traffic through a land-based host network to a cellular device user aboard an aircraft, the cellular device user having an associated cellular telephone number, comprising:
   receiving, at the host network, a request to register the presence of the cellular device user aboard the aircraft, the request including at least a temporary identification code representing a cellular telephone aboard the aircraft;
   the host network advising the cellular device user's home network that the cellular device user is within the operating jurisdiction of the host network;
   associating, at the host network, a primary divert on busy instruction with the cellular telephone number, the divert on busy instruction representing an instruction to divert an incoming call to a communication system on board the aircraft; and considering a current operational state associated with the cellular telephone number as busy, regardless of an actual operational state of the cellular telephone;

wherein, upon receipt of an incoming call to the cellular telephone number, the host forwards an incoming call to the communication system on board the aircraft consistent with the primary divert on busy instruction.

8. The method of claim 7, wherein said associating a primary divert on busy instruction comprises giving an identifier of the communication system on board the aircraft priority over any preset divert on busy instruction.

9. The method of claim 7, wherein the communication system on board the aircraft is a communication device wirelessly coupled with the cellular telephone aboard the aircraft.

10. The method of claim 7, wherein said associating the primary divert on busy instruction comprises modifying preset diversion instructions associated with the cellular telephone to include the communication system on board the aircraft.

11. The method of claim 7, further comprising:
receiving an incoming call for the cellular telephone number; and
forwarding the incoming call to the communication system on board the aircraft.

12. The method of claim 7, the cellular telephone having at least one original divert on busy instruction prior to said associating a primary divert on busy instruction, the method further comprising:
receiving an incoming call for the cellular telephone number; and
diverting, in response to an actual state of the cellular telephone being busy, the incoming call consistent with the at least one original divert on busy instruction.

13. A method for forwarding incoming telephone communications to an aircraft, compnsing:
receiving a request to divert incoming calls for a telephone number to a communication system on board an aircraft, the request including at least a temporary identification code representing a telephone aboard the aircraft;
associating a diversion instruction with the telephone number, the diversion instruction representing an instruction to forward an incoming call for the telephone number to the communications system aboard the aircraft; and
considering a state of a telephone associated with the telephone number as busy, regardless of an actual state of the telephone;
wherein, an incoming telephone call to the telephone number is forwarded, consistent with said considering and in accordance with the diversion instruction, to the communications system on board the aircraft.

14. The method of claim 13, wherein said associating a diversion instruction comprises giving priority to an address of the communications system on board the aircraft over any previous diversion instruction.

15. The method of claim 13, wherein the communication system on board the aircraft is a communication device in wireless communication with the telephone aboard the aircraft.

16. The method of claim 13, wherein said associating a diversion instruction comprises modifying a preset diversion instruction associated with the telephone to include the communication system on board the aircraft.

17. The method of claim 13, further comprising:
receiving an incoming call for the telephone number; and
forwarding the incoming call to the communication system on board the aircraft.

18. The method of claim 13, the telephone having at least one original diversion instruction prior to said associating a diversion instruction, the method further comprising:
receiving an incoming call for the telephone number;
diverting, in response to an actual state of the telephone being busy, the incoming call consistent with the at least one original diversion instruction.

19. A method for routing incoming telephone traffic through a land-based host network to a telephone device user aboard an aircraft, the telephone device user having an associated telephone number, comprising:
receiving, at the host network, a request to register the presence of the telephone device user aboard the aircraft, the request including at least a temporary identification code representing a telephone aboard the aircraft;
the host network advising the telephone device user's home network that the telephone device user is within the operating jurisdiction of the host network;
associating, at the host network, a primary divert on busy instruction with the telephone number, the divert on busy instruction representing an instruction to divert an incoming call to a communication system on board the aircraft; and
considering a current operational state associated with the telephone number as busy, regardless of an actual operational state of the telephone;
wherein, upon receipt of an incoming call to the telephone number, the host forwards an incoming call to the communication system on board the aircraft consistent with the primary divert on busy instruction.

20. The method of claim 19, wherein said associating a primary divert on busy instruction comprises giving an identifier of the communication system on board the aircraft priority over any preset divert on busy instruction.

21. The method of claim 19, wherein the communication system on board the aircraft is a communication device wirelessly coupled with the telephone aboard the aircraft.

22. The method of claim 19, wherein said associating the primary divert on busy instruction comprises modifying preset diversion instructions associated with the telephone to include the communication system on board the aircraft.

23. The method of claim 19, further comprising:
receiving an incoming call for the telephone number; and
forwarding the incoming call to the communication system on board the aircraft.

24. The method of claim 19, the telephone having at least one original divert on busy instruction prior to said associating a primary divert on busy instruction, the method further comprising:
receiving an incoming call for the cellular telephone number; and
diverting, in response to an actual state of the cellular telephone being busy, the incoming call consistent with the at least one original divert on busy instruction.

* * * * *

UNITED STATES PATENT AND TRADEMARK OFFICE
CERTIFICATE OF CORRECTION

| | | |
|---|---|---|
| PATENT NO. | : 7,406,309 B2 | Page 1 of 1 |
| APPLICATION NO. | : 09/833593 | |
| DATED | : July 29, 2008 | |
| INVENTOR(S) | : Martin Philip Usher and Andrew Robert Mead | |

It is certified that error appears in the above-identified patent and that said Letters Patent is hereby corrected as shown below:

On the Title Page, Item (73), change: "Assignee: General Dynamics Advanced Information Systems, Inc., Fairfax, Va (US)" to --Assignee: Stratos Global Limited, 6th Floor, Finsbury Square, London, United Kingdom EC2A1--

Signed and Sealed this

Seventh Day of April, 2009

JOHN DOLL
*Acting Director of the United States Patent and Trademark Office*